United States Patent
Gass et al.

(10) Patent No.: US 7,712,403 B2
(45) Date of Patent: May 11, 2010

(54) ACTUATORS FOR USE IN FAST-ACTING SAFETY SYSTEMS

(75) Inventors: Stephen F. Gass, Wilsonville, OR (US); David A. Fanning, Vancouver, WA (US)

(73) Assignee: SD3, LLC, Tualatin, OR (US)

( * ) Notice: Subject to any disclaimer, the term of this patent is extended or adjusted under 35 U.S.C. 154(b) by 1104 days.

(21) Appl. No.: 10/189,027

(22) Filed: Jul. 2, 2002

(65) Prior Publication Data

US 2003/0005588 A1 Jan. 9, 2003

Related U.S. Application Data

(60) Provisional application No. 60/302,916, filed on Jul. 3, 2001.

(51) Int. Cl.
*B26D 5/08* (2006.01)
(52) U.S. Cl. .............................................. 83/58; 83/526
(58) Field of Classification Search ............. 361/23–25, 361/29–33; 83/58, 453, 490, 526; 80/58, 80/453, 490
See application file for complete search history.

(56) References Cited

U.S. PATENT DOCUMENTS

| 146,886 A | 1/1874 | Doane et al. |
| 162,814 A | 5/1875 | Graves et al. |
| 261,090 A | 7/1882 | Grill |
| 264,412 A | 9/1882 | Kuhlmann |
| 299,480 A | 5/1884 | Kuhlmann et al. |
| 302,041 A | 7/1884 | Sill |
| 307,112 A | 10/1884 | Groff |
| 509,253 A | 11/1893 | Shields |
| 545,504 A | 9/1895 | Hoover |
| 869,513 A | 10/1907 | Pfeil |
| 941,726 A | 11/1909 | Pfalzgraf |
| 982,312 A | 1/1911 | Swafford |
| 997,720 A | 7/1911 | Troupenat |
| 1,037,843 A | 9/1912 | Ackley |
| 1,050,649 A | 1/1913 | Harrold et al. |
| 1,054,558 A | 2/1913 | Jones |
| 1,074,198 A | 9/1913 | Phillips |
| 1,082,870 A | 12/1913 | Humason |
| 1,101,515 A | 6/1914 | Adam |
| 1,126,970 A | 2/1915 | Folmer |
| 1,132,129 A | 3/1915 | Stevens |

(Continued)

FOREIGN PATENT DOCUMENTS

CA          2140991         1/1995

(Continued)

OTHER PUBLICATIONS

Gordon Engineering Corp., Product Catalog, Oct. 1997, pp. cover, 1, 3 and back, Brookfield, Connecticut, US.

(Continued)

*Primary Examiner*—Danny Nguyen

(57) ABSTRACT

Cutting machines with high-speed safety systems, and actuators used in high-speed safety systems, are disclosed. The cutting machines may include a detection system adapted to detect a dangerous condition between a cutting tool and a person. A reaction system performs a specified action, such as stopping the cutting tool, upon detection of the dangerous condition. An actuator may be used to trigger the reaction system to perform the specified action.

10 Claims, 5 Drawing Sheets

U.S. PATENT DOCUMENTS

| | | |
|---|---|---|
| 1,148,169 A | 7/1915 | Howe |
| 1,154,209 A | 9/1915 | Rushton |
| 1,205,246 A | 11/1916 | Mowry |
| 1,228,047 A | 5/1917 | Reinhold |
| 1,240,430 A | 9/1917 | Erickson |
| 1,244,187 A | 10/1917 | Frisbie |
| 1,258,961 A | 3/1918 | Tattersall |
| 1,255,886 A | 12/1918 | Jones |
| 1,311,508 A | 7/1919 | Harrold |
| 1,324,136 A | 12/1919 | Turner |
| 1,381,612 A | 6/1921 | Anderson |
| 1,397,606 A | 11/1921 | Smith |
| RE15,262 E | 1/1922 | Gurgel |
| 1,427,005 A | 8/1922 | McMichael |
| 1,430,983 A | 10/1922 | Granberg |
| 1,450,906 A | 4/1923 | Anderson |
| 1,464,924 A | 8/1923 | Drummond |
| 1,465,224 A | 8/1923 | Lantz |
| 1,492,145 A | 4/1924 | Talley |
| 1,496,212 A | 6/1924 | French |
| 1,511,797 A | 10/1924 | Berghold |
| 1,526,128 A | 2/1925 | Flohr |
| 1,527,587 A | 2/1925 | Hutchinson |
| 1,551,900 A | 9/1925 | Morrow |
| 1,553,996 A | 9/1925 | Federer |
| 1,582,483 A | 4/1926 | Runyan |
| 1,590,988 A | 6/1926 | Campbell |
| 1,600,604 A | 9/1926 | Sorlien |
| 1,616,478 A | 2/1927 | Watson |
| 1,640,517 A | 8/1927 | Procknow |
| 1,662,372 A | 3/1928 | Ward |
| 1,668,061 A | 5/1928 | Falkins |
| 1,701,948 A | 2/1929 | Crowe |
| 1,711,490 A | 5/1929 | Drummond |
| 1,712,828 A | 5/1929 | Klehm |
| 1,774,521 A | 9/1930 | Neighbour |
| 1,807,120 A | 5/1931 | Lewis |
| 1,811,066 A | 6/1931 | Tannewitz |
| 1,879,280 A | 9/1932 | James |
| 1,896,924 A | 2/1933 | Ulrich |
| 1,902,270 A | 3/1933 | Tate |
| 1,904,005 A | 4/1933 | Masset |
| 1,910,651 A | 5/1933 | Tautz |
| 1,938,548 A | 12/1933 | Tautz |
| 1,938,549 A | 12/1933 | Tautz |
| 1,963,688 A | 6/1934 | Tautz |
| 1,988,102 A | 1/1935 | Woodward |
| 1,993,219 A | 3/1935 | Merrigan |
| 2,007,887 A | 7/1935 | Tautz |
| 2,010,851 A | 8/1935 | Drummond |
| 2,020,222 A | 11/1935 | Tautz |
| 2,038,810 A | 4/1936 | Tautz |
| 2,044,481 A | 6/1936 | Manley et al. |
| 2,075,282 A | 3/1937 | Hedgpeth |
| 2,095,330 A | 10/1937 | Hedgpeth |
| 2,106,288 A | 1/1938 | Tautz |
| 2,106,321 A | 1/1938 | Guertin |
| 2,121,069 A | 6/1938 | Collins |
| 2,131,492 A | 9/1938 | Ocenasek |
| 2,163,320 A | 6/1939 | Hammond |
| 2,168,282 A | 8/1939 | Tautz |
| 2,241,556 A | 5/1941 | MacMillin et al. |
| 2,261,696 A | 11/1941 | Ocenasek |
| 2,265,407 A | 12/1941 | Tautz |
| 2,286,589 A | 6/1942 | Tannewitz |
| 2,292,872 A | 8/1942 | Eastman |
| 2,299,262 A | 10/1942 | Uremovich |
| 2,312,118 A | 2/1943 | Neisewander |
| 2,313,686 A | 3/1943 | Uremovich |
| 2,328,244 A | 8/1943 | Woodward |
| 2,352,235 A | 6/1944 | Tautz |
| 2,377,265 A | 3/1945 | Rady |
| 2,392,486 A | 1/1946 | Larsen |
| 2,402,232 A | 6/1946 | Baker |
| 2,425,331 A | 8/1947 | Kramer |
| 2,434,174 A | 1/1948 | Morgan |
| 2,466,325 A | 4/1949 | Ocenasek |
| 2,496,613 A | 2/1950 | Woodward |
| 2,501,134 A | 3/1950 | Meckoski et al. |
| 2,509,813 A | 5/1950 | Dineen |
| 2,517,649 A | 8/1950 | Frechtmann |
| 2,518,684 A | 8/1950 | Harris |
| 2,530,290 A | 11/1950 | Collins |
| 2,554,124 A | 5/1951 | Salmont |
| 2,562,396 A | 7/1951 | Schutz |
| 2,572,326 A | 10/1951 | Evans |
| 2,590,035 A | 3/1952 | Pollak |
| 2,593,596 A | 4/1952 | Olson |
| 2,601,878 A | 7/1952 | Anderson |
| 2,623,555 A | 12/1952 | Eschenburg |
| 2,625,966 A | 1/1953 | Copp |
| 2,626,639 A | 1/1953 | Hess |
| 2,661,777 A | 12/1953 | Hitchcock |
| 2,661,780 A | 12/1953 | Morgan |
| 2,675,707 A | 4/1954 | Brown |
| 2,678,071 A | 5/1954 | Odlum et al. |
| 2,690,084 A | 9/1954 | Van Dam |
| 2,695,638 A | 11/1954 | Gaskell |
| 2,704,560 A | 3/1955 | Woessner |
| 2,711,762 A | 6/1955 | Gaskell |
| 2,719,547 A | 10/1955 | Gjerde |
| 2,722,246 A | 11/1955 | Arnoldy |
| 2,731,049 A | 1/1956 | Akin |
| 2,736,348 A | 2/1956 | Nelson |
| 2,758,615 A | 8/1956 | Mastriforte |
| 2,785,710 A * | 3/1957 | Mowery, Jr. .................. 83/68 |
| 2,786,496 A | 3/1957 | Eschenburg |
| 2,804,890 A | 9/1957 | Fink |
| 2,810,408 A | 10/1957 | Boice et al. |
| 2,839,943 A | 6/1958 | Caldwell et al. |
| 2,844,173 A | 7/1958 | Gaskell |
| 2,850,054 A | 9/1958 | Eschenburg |
| 2,852,047 A | 9/1958 | Odlum et al. |
| 2,873,773 A | 2/1959 | Gaskell |
| 2,876,809 A | 3/1959 | Rentsch et al. |
| 2,894,546 A | 7/1959 | Eschenburg |
| 2,913,025 A | 11/1959 | Richards |
| 2,937,672 A | 5/1960 | Gjerde |
| 2,945,516 A | 7/1960 | Edgemond, Jr. et al. |
| 2,954,118 A | 9/1960 | Anderson |
| 2,978,084 A | 4/1961 | Vilkaitis |
| 2,984,268 A | 5/1961 | Vuichard |
| 2,991,593 A | 7/1961 | Cohen |
| 3,005,477 A | 10/1961 | Sherwen |
| 3,007,501 A | 11/1961 | Mundell et al. |
| 3,011,529 A | 12/1961 | Copp |
| 3,011,610 A | 12/1961 | Stiebel et al. |
| 3,013,592 A | 12/1961 | Ambrosio et al. |
| 3,021,881 A | 2/1962 | Edgemond, Jr. et al. |
| 3,047,116 A | 7/1962 | Stiebel et al. |
| 3,085,602 A | 4/1963 | Gaskell |
| 3,105,530 A | 10/1963 | Peterson |
| 3,129,731 A | 4/1964 | Tyrrell |
| 3,163,732 A | 12/1964 | Abbott |
| 3,184,001 A | 5/1965 | Reinsch et al. |
| 3,186,256 A | 6/1965 | Reznick |
| 3,207,273 A | 9/1965 | Jurin |
| 3,224,474 A | 12/1965 | Bloom |
| 3,232,326 A | 2/1966 | Speer et al. |
| 3,249,134 A | 5/1966 | Vogl et al. |
| 3,274,876 A | 9/1966 | Debus |
| 3,276,497 A | 10/1966 | Heer |
| 3,306,149 A | 2/1967 | John |
| 3,313,185 A | 4/1967 | Drake et al. |

| | | | | | | |
|---|---|---|---|---|---|---|
| 3,315,715 A | | 4/1967 | Mytinger | 4,091,698 A | | 5/1978 | Obear et al. |
| 3,323,814 A | | 6/1967 | Phillips | 4,106,378 A | | 8/1978 | Kaiser |
| 3,337,008 A | | 8/1967 | Trachte | 4,117,752 A | | 10/1978 | Yoneda |
| 3,356,111 A | | 12/1967 | Mitchell | 4,145,940 A | | 3/1979 | Woloveke et al. |
| 3,368,596 A | | 2/1968 | Comer | 4,152,833 A | | 5/1979 | Phillips |
| 3,386,322 A | | 6/1968 | Stone et al. | 4,161,649 A | | 7/1979 | Klos et al. |
| 3,454,286 A | | 7/1969 | Anderson et al. | 4,175,452 A | | 11/1979 | Idel |
| 3,538,964 A | | 11/1970 | Warrick et al. | 4,184,394 A | | 1/1980 | Gjerde |
| 3,540,338 A | | 11/1970 | McEwan et al. | 4,190,000 A | | 2/1980 | Shaull et al. |
| 3,554,067 A | | 1/1971 | Scutella | 4,195,722 A | | 4/1980 | Anderson et al. |
| 3,566,996 A | | 3/1971 | Crossman | 4,199,930 A | | 4/1980 | Lebet et al. |
| 3,580,376 A | | 5/1971 | Loshbough | 4,200,002 A | | 4/1980 | Takahashi |
| 3,581,784 A | | 6/1971 | Warrick | 4,206,666 A | | 6/1980 | Ashton |
| 3,593,266 A | | 7/1971 | Van Sickle | 4,206,910 A | | 6/1980 | Biesemeyer |
| 3,613,748 A | | 10/1971 | De Pue | 4,249,117 A | | 2/1981 | Leukhardt et al. |
| 3,621,894 A | | 11/1971 | Niksich | 4,249,442 A | | 2/1981 | Fittery |
| 3,648,126 A | | 3/1972 | Boos et al. | 4,251,599 A | | 2/1981 | McCormick |
| 3,670,788 A | | 6/1972 | Pollak et al. | 4,255,995 A | | 3/1981 | Connor |
| 3,675,444 A | | 7/1972 | Whipple | 4,262,278 A | | 4/1981 | Howard et al. |
| 3,680,609 A | | 8/1972 | Menge | 4,267,914 A | | 5/1981 | Saar |
| 3,688,815 A | | 9/1972 | Ridenour | 4,270,427 A | | 6/1981 | Colberg et al. |
| 3,695,116 A | | 10/1972 | Baur | 4,276,459 A | | 6/1981 | Willett et al. |
| 3,696,844 A | | 10/1972 | Bernatschek | 4,276,799 A | | 7/1981 | Muehling |
| 3,716,113 A | | 2/1973 | Kobayashi et al. | 4,291,794 A | | 9/1981 | Bauer |
| 3,719,103 A | | 3/1973 | Steander | 4,305,442 A | | 12/1981 | Currie |
| 3,740,000 A | | 6/1973 | Takada | 4,319,146 A | | 3/1982 | Wires, Sr. |
| 3,745,546 A | | 7/1973 | Struger et al. | 4,321,841 A | | 3/1982 | Felix |
| 3,749,933 A | | 7/1973 | Davidson | 4,334,450 A | | 6/1982 | Benuzzi |
| 3,754,493 A | | 8/1973 | Niehaus et al. | 4,372,202 A | | 2/1983 | Cameron |
| 3,772,590 A | | 11/1973 | Mikulecky et al. | 4,374,552 A | | 2/1983 | Dayen |
| 3,785,230 A | * | 1/1974 | Lokey .................. 30/388 | 4,385,539 A | | 5/1983 | Meyerhoefer et al. |
| 3,793,915 A | | 2/1974 | Huier | 4,391,358 A | | 7/1983 | Haeger |
| 3,805,639 A | | 4/1974 | Peter | 4,418,597 A | | 12/1983 | Krusemark et al. |
| 3,805,658 A | | 4/1974 | Scott et al. | 4,427,042 A | | 1/1984 | Mitchell et al. |
| 3,808,932 A | | 5/1974 | Russell | 4,466,170 A | | 8/1984 | Davis |
| 3,829,850 A | | 8/1974 | Guetersloh | 4,466,233 A | | 8/1984 | Thesman |
| 3,829,970 A | | 8/1974 | Anderson | 4,470,046 A | | 9/1984 | Betsill |
| 3,858,095 A | | 12/1974 | Friemann et al. | 4,492,291 A | | 1/1985 | Chometon et al. |
| 3,861,016 A | | 1/1975 | Johnson et al. | 4,503,739 A | | 3/1985 | Konieczka |
| 3,863,208 A | | 1/1975 | Balban | 4,510,489 A | | 4/1985 | Anderson, III et al. |
| 3,874,747 A | | 4/1975 | Case et al. | 4,512,224 A | | 4/1985 | Terauchi |
| 3,880,032 A | | 4/1975 | Green | 4,518,043 A | | 5/1985 | Anderson et al. |
| 3,882,744 A | | 5/1975 | McCarroll | 4,532,501 A | | 7/1985 | Hoffman |
| 3,886,413 A | | 5/1975 | Dow et al. | 4,532,844 A | | 8/1985 | Chang et al. |
| 3,889,567 A | | 6/1975 | Sato et al. | 4,557,168 A | | 12/1985 | Tokiwa |
| 3,905,263 A | | 9/1975 | Smith | 4,559,858 A | | 12/1985 | Laskowski et al. |
| 3,922,785 A | | 12/1975 | Fushiya | 4,560,033 A | | 12/1985 | DeWoody et al. |
| 3,924,688 A | | 12/1975 | Cooper et al. | 4,566,512 A | | 1/1986 | Wilson |
| 3,931,727 A | | 1/1976 | Luenser | 4,573,556 A | | 3/1986 | Andreasson |
| 3,935,777 A | | 2/1976 | Bassett | 4,576,073 A | | 3/1986 | Stinson |
| 3,945,286 A | | 3/1976 | Smith | 4,589,047 A | | 5/1986 | Gaus et al. |
| 3,946,631 A | | 3/1976 | Malm | 4,589,860 A | | 5/1986 | Brandenstein et al. |
| 3,947,734 A | | 3/1976 | Fyler | 4,599,597 A | | 7/1986 | Rotbart |
| 3,949,636 A | | 4/1976 | Ball et al. | 4,599,927 A | | 7/1986 | Eccardt et al. |
| 3,953,770 A | | 4/1976 | Hayashi | 4,606,251 A | | 8/1986 | Boileau |
| 3,960,310 A | * | 6/1976 | Nussbaum .................. 228/6.1 | 4,615,247 A | | 10/1986 | Berkeley |
| 3,967,161 A | | 6/1976 | Lichtblau | 4,621,300 A | | 11/1986 | Summerer |
| 3,974,565 A | | 8/1976 | Ellis | 4,625,604 A | | 12/1986 | Handler et al. |
| 3,975,600 A | | 8/1976 | Marston | 4,637,188 A | * | 1/1987 | Crothers .................. 52/404.2 |
| 3,994,192 A | | 11/1976 | Faig | 4,637,289 A | | 1/1987 | Ramsden |
| 4,007,679 A | | 2/1977 | Edwards | 4,644,832 A | | 2/1987 | Smith |
| 4,016,490 A | | 4/1977 | Weckenmann et al. | 4,653,189 A | | 3/1987 | Andreasson |
| 4,026,174 A | | 5/1977 | Fierro | 4,657,428 A | | 4/1987 | Wiley |
| 4,026,177 A | | 5/1977 | Lokey | 4,661,797 A | | 4/1987 | Schmall |
| 4,029,159 A | | 6/1977 | Nymann | 4,672,500 A | | 6/1987 | Tholome et al. |
| 4,047,156 A | | 9/1977 | Atkins | 4,679,719 A | | 7/1987 | Kramer |
| 4,048,886 A | | 9/1977 | Zettler | 4,694,721 A | | 9/1987 | Brickner, Jr. |
| 4,060,160 A | | 11/1977 | Lieber | 4,718,229 A | | 1/1988 | Riley |
| 4,070,940 A | | 1/1978 | McDaniel et al. | 4,721,023 A | | 1/1988 | Bartlett et al. |
| 4,075,961 A | | 2/1978 | Harris | 4,722,021 A | | 1/1988 | Hornung et al. |
| 4,077,161 A | | 3/1978 | Wyle et al. | 4,751,603 A | | 6/1988 | Kwan |
| 4,085,303 A | | 4/1978 | McIntyre et al. | 4,757,881 A | | 7/1988 | Jonsson et al. |
| 4,090,345 A | | 5/1978 | Harkness | 4,774,866 A | | 10/1988 | Dehari et al. |

| | | | | | | |
|---|---|---|---|---|---|---|
| 4,792,965 A | 12/1988 | Morgan | | 5,513,548 A | 5/1996 | Garuglieri |
| 4,805,504 A | 2/1989 | Fushiya et al. | | 5,531,147 A | 7/1996 | Serban |
| 4,831,279 A | 5/1989 | Ingraham | | 5,534,836 A | 7/1996 | Schenkel et al. |
| 4,840,135 A | 6/1989 | Yamauchi | | 5,572,916 A | 11/1996 | Takano |
| 4,864,455 A | 9/1989 | Shimomura et al. | | 5,587,618 A | 12/1996 | Hathaway |
| 4,875,398 A | 10/1989 | Taylor et al. | | 5,592,353 A | 1/1997 | Shinohara et al. |
| 4,888,869 A | 12/1989 | Leatherman | | 5,606,889 A | 3/1997 | Bielinski et al. |
| 4,896,607 A | 1/1990 | Hall et al. | | 5,619,896 A | 4/1997 | Chen |
| 4,906,962 A | 3/1990 | Duimstra | | 5,623,860 A | 4/1997 | Schoene et al. |
| 4,907,679 A | 3/1990 | Menke | | 5,647,258 A | 7/1997 | Brazell et al. |
| 4,934,233 A | 6/1990 | Brundage et al. | | 5,648,644 A | 7/1997 | Nagel |
| 4,936,876 A | 6/1990 | Reyes | | 5,659,454 A | 8/1997 | Vermesse |
| 4,937,554 A | 6/1990 | Herman | | 5,667,152 A | 9/1997 | Mooring |
| 4,962,685 A | 10/1990 | Hagstrom | | 5,671,633 A | 9/1997 | Wagner |
| 4,964,450 A | 10/1990 | Hughes et al. | | 5,695,306 A | 12/1997 | Nygren, Jr. |
| 4,965,909 A | 10/1990 | McCullough et al. | | 5,700,165 A | 12/1997 | Harris et al. |
| 4,969,063 A | 11/1990 | Scott et al. | | 5,720,213 A | 2/1998 | Sberveglieri |
| 4,975,798 A | 12/1990 | Edwards et al. | | 5,722,308 A | 3/1998 | Ceroll et al. |
| 5,020,406 A | 6/1991 | Sasaki et al. | | 5,724,875 A | 3/1998 | Meredith et al. |
| 5,025,175 A | 6/1991 | Dubois, III | | 5,730,165 A | 3/1998 | Philipp |
| 5,042,348 A | 8/1991 | Brundage et al. | | 5,741,048 A | 4/1998 | Eccleston |
| 5,046,426 A | 9/1991 | Julien et al. | | 5,755,148 A | 5/1998 | Stumpf et al. |
| 5,052,255 A | 10/1991 | Gaines | | 5,768,786 A * | 6/1998 | Kane et al. .................... 30/276 |
| 5,074,047 A | 12/1991 | King | | 5,771,742 A | 6/1998 | Bokaie et al. |
| 5,081,406 A | 1/1992 | Hughes et al. | | 5,782,001 A | 7/1998 | Gray |
| 5,082,316 A | 1/1992 | Wardlaw | | 5,787,779 A | 8/1998 | Garuglieri |
| 5,083,973 A | 1/1992 | Townsend | | 5,791,057 A | 8/1998 | Nakamura et al. |
| 5,086,890 A | 2/1992 | Turczyn et al. | | 5,791,223 A | 8/1998 | Lanzer |
| 5,094,000 A | 3/1992 | Becht et al. | | 5,791,224 A | 8/1998 | Suzuki et al. |
| 5,116,249 A | 5/1992 | Shiotani et al. | | 5,791,441 A | 8/1998 | Matos et al. |
| 5,119,555 A | 6/1992 | Johnson | | 5,797,307 A | 8/1998 | Horton |
| 5,122,091 A | 6/1992 | Townsend | | 5,819,619 A | 10/1998 | Miller et al. |
| 5,123,317 A | 6/1992 | Barnes, Jr. et al. | | 5,819,625 A | 10/1998 | Sberveglieri |
| 5,146,714 A | 9/1992 | Luber | | 5,852,951 A | 12/1998 | Santi |
| 5,174,349 A | 12/1992 | Svetlik et al. | | 5,857,507 A | 1/1999 | Puzio et al. |
| 5,184,534 A | 2/1993 | Lee | | 5,861,809 A | 1/1999 | Eckstein et al. |
| 5,198,702 A | 3/1993 | McCullough et al. | | 5,875,698 A | 3/1999 | Ceroll et al. |
| 5,199,343 A | 4/1993 | OBanion | | 5,880,954 A | 3/1999 | Thomson et al. |
| 5,201,110 A | 4/1993 | Bane | | 5,921,367 A | 7/1999 | Kashioka et al. |
| 5,201,684 A | 4/1993 | DeBois, III | | 5,927,857 A | 7/1999 | Ceroll et al. |
| 5,206,625 A | 4/1993 | Davis | | 5,930,096 A | 7/1999 | Kim |
| 5,207,253 A | 5/1993 | Hoshino et al. | | 5,937,720 A | 8/1999 | Itzov |
| 5,212,621 A | 5/1993 | Panter | | 5,942,975 A | 8/1999 | Sorensen |
| 5,218,189 A | 6/1993 | Hutchison | | 5,943,932 A | 8/1999 | Sberveglieri |
| 5,230,269 A | 7/1993 | Shiotani et al. | | 5,950,514 A | 9/1999 | Benedict et al. |
| 5,231,359 A | 7/1993 | Masuda et al. | | 5,963,173 A | 10/1999 | Lian et al. |
| 5,231,906 A | 8/1993 | Kogej | | 5,974,927 A | 11/1999 | Tsune |
| 5,239,978 A | 8/1993 | Plangetis | | 5,989,116 A | 11/1999 | Johnson et al. |
| 5,245,879 A | 9/1993 | McKeon | | 6,009,782 A | 1/2000 | Tajima et al. |
| 5,257,570 A | 11/1993 | Shiotani et al. | | 6,018,284 A | 1/2000 | Rival et al. |
| 5,265,510 A | 11/1993 | Hoyer-Ellefsen | | 6,037,729 A | 3/2000 | Woods et al. |
| 5,272,946 A * | 12/1993 | McCullough et al. .......... 83/58 | | 6,052,884 A | 4/2000 | Steckler et al. |
| 5,276,431 A | 1/1994 | Piccoli et al. | | 6,062,121 A | 5/2000 | Ceroll et al. |
| 5,285,708 A | 2/1994 | Bosten et al. | | 6,070,484 A | 6/2000 | Sakamaki |
| 5,293,802 A | 3/1994 | Shiotani et al. | | 6,095,092 A | 8/2000 | Chou |
| 5,320,382 A | 6/1994 | Goldstein et al. | | 6,112,785 A | 9/2000 | Yu |
| 5,321,230 A | 6/1994 | Shanklin et al. | | 6,119,984 A | 9/2000 | Devine |
| 5,331,875 A | 7/1994 | Mayfield | | 6,133,818 A | 10/2000 | Hsieh et al. |
| 5,353,670 A | 10/1994 | Metzger, Jr. | | 6,141,192 A | 10/2000 | Garzon |
| 5,377,554 A | 1/1995 | Reulein et al. | | 6,148,504 A | 11/2000 | Schmidt et al. |
| 5,377,571 A | 1/1995 | Josephs | | 6,148,526 A | 11/2000 | Kirn et al. |
| 5,392,678 A | 2/1995 | Sasaki et al. | | 6,148,703 A | 11/2000 | Ceroll et al. |
| 5,401,928 A | 3/1995 | Kelley | | 6,150,826 A | 11/2000 | Hokodate et al. |
| 5,411,221 A | 5/1995 | Collins et al. | | 6,161,459 A | 12/2000 | Ceroll et al. |
| 5,423,232 A | 6/1995 | Miller et al. | | 6,170,370 B1 | 1/2001 | Sommerville |
| 5,447,085 A | 9/1995 | Gochnauer | | 6,244,149 B1 | 6/2001 | Ceroll et al. |
| 5,451,750 A | 9/1995 | An | | 6,250,190 B1 | 6/2001 | Ceroll et al. |
| 5,453,903 A | 9/1995 | Chow | | 6,257,061 B1 | 7/2001 | Nonoyama et al. |
| 5,471,888 A | 12/1995 | McCormick | | 6,283,002 B1 | 9/2001 | Chiang |
| 5,480,009 A | 1/1996 | Wieland et al. | | 6,295,910 B1 | 10/2001 | Childs et al. |
| 5,503,059 A | 4/1996 | Pacholok | | 6,312,028 B1 | 11/2001 | Wilkosz |
| 5,510,587 A | 4/1996 | Reiter | | 6,325,195 B1 | 12/2001 | Doherty |
| 5,510,685 A | 4/1996 | Grasselli | | 6,336,273 B1 | 1/2002 | Nilsson et al. |

| Patent No. | Date | Inventor |
|---|---|---|
| 6,352,137 B1 | 3/2002 | Stegall et al. |
| 6,357,328 B1 | 3/2002 | Ceroll et al. |
| 6,361,092 B1 | 3/2002 | Eagle et al. |
| 6,366,099 B1 | 4/2002 | Reddi |
| 6,376,939 B1 | 4/2002 | Suzuki et al. |
| 6,404,098 B1 * | 6/2002 | Kayama et al. ............. 310/307 |
| 6,405,624 B2 | 6/2002 | Sutton |
| 6,418,829 B1 | 7/2002 | Pilchowski |
| 6,420,814 B1 * | 7/2002 | Bobbio ................ 310/309 |
| 6,427,570 B1 | 8/2002 | Miller et al. |
| 6,430,007 B1 * | 8/2002 | Jabbari ................ 360/256.1 |
| 6,431,425 B1 | 8/2002 | Moorman et al. |
| 6,450,077 B1 | 9/2002 | Ceroll et al. |
| 6,453,786 B1 | 9/2002 | Ceroll et al. |
| 6,460,442 B2 | 10/2002 | Talesky et al. |
| 6,471,106 B1 | 10/2002 | Reining |
| 6,479,958 B1 | 11/2002 | Thompson et al. |
| 6,484,614 B1 | 11/2002 | Huang |
| D466,913 S | 12/2002 | Ceroll et al. |
| 6,492,802 B1 | 12/2002 | Bielski |
| D469,354 S | 1/2003 | Curtsinger |
| 6,502,493 B1 | 1/2003 | Eccardt et al. |
| 6,530,303 B1 | 3/2003 | Parks et al. |
| 6,536,536 B1 | 3/2003 | Gass et al. |
| 6,543,324 B2 | 4/2003 | Dils |
| 6,546,835 B2 | 4/2003 | Wang |
| 6,564,909 B1 | 5/2003 | Razzano |
| 6,575,067 B2 | 6/2003 | Parks et al. |
| 6,578,460 B2 | 6/2003 | Sartori |
| 6,578,856 B2 | 6/2003 | Kahle |
| 6,581,655 B2 | 6/2003 | Huang |
| 6,595,096 B2 | 7/2003 | Ceroll et al. |
| D478,917 S | 8/2003 | Ceroll et al. |
| 6,601,493 B1 | 8/2003 | Crofutt |
| 6,607,015 B1 | 8/2003 | Chen |
| D479,538 S | 9/2003 | Welsh et al. |
| 6,617,720 B1 | 9/2003 | Egan, III et al. |
| 6,619,348 B2 | 9/2003 | Wang |
| 6,640,683 B2 | 11/2003 | Lee |
| 6,644,157 B2 | 11/2003 | Huang |
| 6,647,847 B2 | 11/2003 | Hewitt et al. |
| 6,659,233 B2 | 12/2003 | DeVlieg |
| 6,684,750 B2 | 2/2004 | Yu |
| 6,722,242 B2 | 4/2004 | Chuang |
| 6,734,581 B1 | 5/2004 | Griffis |
| 6,736,042 B2 | 5/2004 | Behne et al. |
| 6,742,430 B2 | 6/2004 | Chen |
| 6,800,819 B2 | 10/2004 | Sato et al. |
| 6,826,988 B2 | 12/2004 | Gass et al. |
| 6,826,992 B1 | 12/2004 | Huang |
| 6,840,144 B2 | 1/2005 | Huang |
| 6,854,371 B2 | 2/2005 | Yu |
| 6,857,345 B2 | 2/2005 | Gass et al. |
| 6,874,397 B2 | 4/2005 | Chang |
| 6,874,399 B2 | 4/2005 | Lee |
| 6,883,397 B2 | 4/2005 | Kimizuka |
| 6,889,585 B1 | 5/2005 | Harris et al. |
| 6,922,153 B2 | 7/2005 | Pierga et al. |
| 6,968,767 B2 | 11/2005 | Yu |
| 6,986,370 B1 | 1/2006 | Schoene et al. |
| 6,994,004 B2 | 2/2006 | Gass et al. |
| 6,997,090 B2 | 2/2006 | Gass et al. |
| 7,000,514 B2 | 2/2006 | Gass et al. |
| 7,024,975 B2 * | 4/2006 | Gass et al. ................ 83/62.1 |
| 7,055,417 B1 | 6/2006 | Gass |
| 7,077,039 B2 | 7/2006 | Gass et al. |
| 7,098,800 B2 | 8/2006 | Gass |
| 7,100,483 B2 | 9/2006 | Gass et al. |
| 7,137,326 B2 | 11/2006 | Gass et al. |
| 2001/0032534 A1 | 10/2001 | Ceroll et al. |
| 2002/0017175 A1 | 2/2002 | Gass et al. |
| 2002/0017176 A1 | 2/2002 | Gass et al. |
| 2002/0017178 A1 | 2/2002 | Gass et al. |
| 2002/0017179 A1 | 2/2002 | Gass et al. |
| 2002/0017180 A1 | 2/2002 | Gass et al. |
| 2002/0017181 A1 | 2/2002 | Gass et al. |
| 2002/0017182 A1 | 2/2002 | Gass et al. |
| 2002/0017183 A1 | 2/2002 | Gass et al. |
| 2002/0017184 A1 | 2/2002 | Gass et al. |
| 2002/0017336 A1 | 2/2002 | Gass et al. |
| 2002/0020261 A1 | 2/2002 | Gass et al. |
| 2002/0020262 A1 | 2/2002 | Gass et al. |
| 2002/0020263 A1 | 2/2002 | Gass et al. |
| 2002/0020265 A1 | 2/2002 | Gass et al. |
| 2002/0020271 A1 | 2/2002 | Gass et al. |
| 2002/0043776 A1 | 4/2002 | Chuang |
| 2002/0050201 A1 | 5/2002 | Lane et al. |
| 2002/0056348 A1 | 5/2002 | Gass et al. |
| 2002/0056349 A1 | 5/2002 | Gass et al. |
| 2002/0056350 A1 | 5/2002 | Gass et al. |
| 2002/0059853 A1 | 5/2002 | Gass et al. |
| 2002/0059854 A1 | 5/2002 | Gass et al. |
| 2002/0059855 A1 | 5/2002 | Gass et al. |
| 2002/0066346 A1 | 6/2002 | Gass et al. |
| 2002/0069734 A1 | 6/2002 | Gass et al. |
| 2002/0088325 A1 | 7/2002 | Talesky et al. |
| 2002/0096030 A1 | 7/2002 | Wang |
| 2002/0096591 A1 | 7/2002 | Tanji |
| 2002/0109036 A1 | 8/2002 | Denen et al. |
| 2002/0134212 A1 | 9/2002 | Ceroll et al. |
| 2002/0170399 A1 | 11/2002 | Gass et al. |
| 2002/0170400 A1 | 11/2002 | Gass |
| 2002/0174755 A1 | 11/2002 | Behne et al. |
| 2002/0190581 A1 | 12/2002 | Gass et al. |
| 2003/0000359 A1 | 1/2003 | Eccardt et al. |
| 2003/0002942 A1 | 1/2003 | Gass et al. |
| 2003/0005588 A1 | 1/2003 | Gass et al. |
| 2003/0019341 A1 | 1/2003 | Gass et al. |
| 2003/0020336 A1 | 1/2003 | Gass et al. |
| 2003/0037651 A1 | 2/2003 | Gass et al. |
| 2003/0037655 A1 | 2/2003 | Chin-Chin |
| 2003/0056853 A1 | 3/2003 | Gass et al. |
| 2003/0074873 A1 | 4/2003 | Freiberg et al. |
| 2003/0089212 A1 | 5/2003 | Parks et al. |
| 2003/0101857 A1 | 6/2003 | Chuang |
| 2003/0109798 A1 | 6/2003 | Kermani |
| 2003/0213349 A1 | 11/2003 | Chang |
| 2004/0011177 A1 | 1/2004 | Huang |
| 2004/0060404 A1 | 4/2004 | Metzger, Jr. |
| 2004/0104085 A1 | 6/2004 | Lang et al. |
| 2004/0159198 A1 | 8/2004 | Peot et al. |
| 2004/0194594 A1 | 10/2004 | Dils et al. |
| 2004/0200329 A1 | 10/2004 | Sako |
| 2004/0226424 A1 * | 11/2004 | O'Banion et al. ............. 83/397 |
| 2004/0226800 A1 | 11/2004 | Pierga et al. |
| 2004/0255745 A1 | 12/2004 | Peot et al. |
| 2005/0057206 A1 | 3/2005 | Uneyama |
| 2005/0092149 A1 | 5/2005 | Hartmann |
| 2005/0139051 A1 | 6/2005 | Gass et al. |
| 2005/0139056 A1 | 6/2005 | Gass et al. |
| 2005/0139057 A1 | 6/2005 | Gass et al. |
| 2005/0139058 A1 | 6/2005 | Gass et al. |
| 2005/0139459 A1 | 6/2005 | Gass et al. |
| 2005/0211034 A1 | 9/2005 | Sasaki et al. |
| 2005/0235793 A1 | 10/2005 | O'Banion et al. |
| 2005/0274432 A1 | 12/2005 | Gass et al. |
| 2006/0000337 A1 | 1/2006 | Gass |
| 2006/0032352 A1 | 2/2006 | Gass et al. |
| 2006/0123960 A1 | 6/2006 | Gass et al. |
| 2006/0123964 A1 | 6/2006 | Gass et al. |
| 2006/0179983 A1 | 8/2006 | Gass et al. |
| 2006/0219076 A1 | 10/2006 | Gass et al. |
| 2006/0225551 A1 | 10/2006 | Gass |
| 2006/0230896 A1 | 10/2006 | Gass |
| 2006/0247795 A1 | 11/2006 | Gass et al. |
| 2006/0254401 A1 | 11/2006 | Gass et al. |

2006/0272463 A1    12/2006    Gass

FOREIGN PATENT DOCUMENTS

| | | |
|---|---|---|
| CH | 297525 | 6/1954 |
| DE | 76186 | 8/1921 |
| DE | 2800403 | 7/1979 |
| DE | 3427733 | 1/1986 |
| DE | 3427733 A1 * | 1/1986 |
| DE | 4205965 C1 | 2/1992 |
| DE | 4235161 A1 | 5/1993 |
| DE | 4326313 | 2/1995 |
| DE | 19609771 | 6/1998 |
| DE | 20102704 | 2/2001 |
| EP | 146460 | 11/1988 |
| EP | 0362937 A2 | 4/1990 |
| ES | 2152184 | 1/2001 |
| FR | 2556643 | 6/1985 |
| FR | 2570017 | 3/1986 |
| GB | 598204 | 2/1948 |
| GB | 2096844 | 10/1982 |
| GB | 2142571 | 1/1985 |
| JP | 06328359 | 11/1994 |

OTHER PUBLICATIONS

Sink Drain Plug Lifter, circa 1974.
Skil Model 3400-Type 1 10" Table Saw Parts List and Technical Bulletin, S-B Power Tool Company, Jun. 1993.
Shop Fox® Fence Operating Manual, Woodstock International, Inc., 1996, revised May 1997.
Analog Devices, Inc., 3-Axis Capacitive Sensor—Preliminary Technical Data AD7103, pp. 1-40, © 1998.
Excaliber T-Slot Precision Saw Fence Model TT45 Owner's Manual, Sommerville Design & Manufacturing, Inc., May 2000.
Bosch Model 4000 Worksite Table Saw Operating/Safety Instructions, S-B Power Tool Company, Jul. 2000.
XACTA Fence II™ Homeshop 30/52 Owner's Manual, JET Equipment & Tools, Mar. 2001.
XACTA Fence II™ Commercial 30/50 Owner's Manual, JET Equipment & Tools, Mar. 2001.
Bosch 10" Table Saw Model 0601476139 Parts List and Technical Bulletin, S-B Power Tool Company, Apr. 2001.
Biesemeyer® T-Square® Universal Home Shop Fence system Instruction Manual, Delta Machinery, Jun. 1, 2001.
Powermatic 10" Tilting Arbor Saw Model 66 Instruction Manual & Parts List, JET Equipment & Tools, Jun. 2001.
Skil Model 3400 Table Saw Operating/Safety Instructions, S-B Power Tool Co., Sep. 2001.
Tablesaw Splitters and Blade Covers, *Fine Woodworking*, pp. 77-81, Dec. 2001.
The Merlin Splitter by Excalibur a Sommerville Design Product Overview & Generic Installation Notes, Sommerville Design & Manufacturing Inc., at least as early as 2002.
INCRA Incremental Micro Precision Table Saw Fence Owner's Manual, Taylor Design Group, Inc., 2003.
Craftsman® Power and Hand Tools, pp. 142-143, 2003.
Shop Fox® Models W2005, W2006, W2007 Classic Fence Instruction Manual, Woodstock International, Jan. 2000, revised Mar. 2004.
ACCU-FENCE® 64A Fence and Rail System Owner's Manual, WMH Tool Group, Sep. 2004.
Unifence™ Saw Guide Instruction Manual, Delta Machinery, Feb. 22, 2005.
Biesemeyer® T-Square® Commercial Fence System Instruction Manual, Delta Machinery, May 2, 2005.
Young Inventor: Teen's Device Earns Her Trip to Science Fair, *The Arizona Republic*, May 5, 2006.
Operator Injury Mitigation Using Electronic Sensing and Mechanical Braking and Decoupling Devices in Handheld Circular Saws, Eric F. Eppard, date unknown.
Grizzly Industrial, Inc. Model G0605X/G0606X Extreme Series 12" Table Saw Owner's Manual, Grizzly Industrial, Inc., Oct. 2006.
U.S. Appl. No. 60/157,340, filed Oct. 1, 1999, entitled "Fast-Acting Safety Stop."
U.S. Appl. No. 60/182,866, filed Feb. 16, 2000, entitled "Fast-Acting Safety Stop."
IWF 2000 Challengers Award Official Entry Form, submitted Apr. 26, 2000, 6 pages plus CD (the portions of US patent applications referenced in the form are from U.S. Appl. No. 60/157,340, filed Oct. 1, 1999 and U.S. Appl. No. 60/182,866, filed Feb. 16, 2000).

* cited by examiner

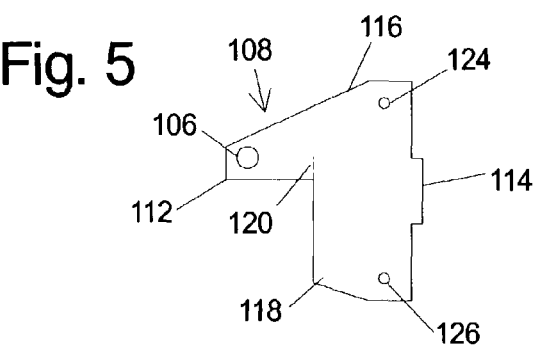
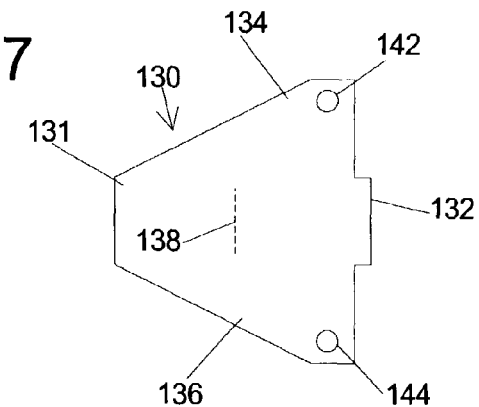
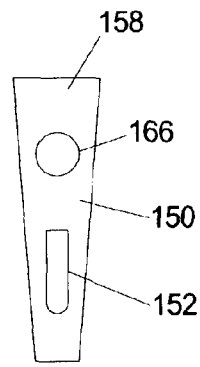
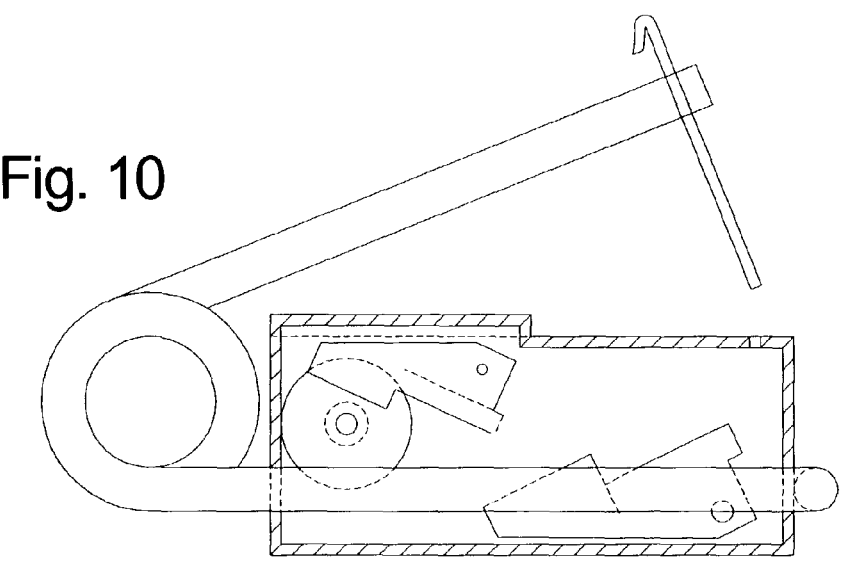

ACTUATORS FOR USE IN FAST-ACTING SAFETY SYSTEMS

CROSS-REFERENCE TO RELATED APPLICATION

This application claims the benefit of and priority from U.S. Provisional Patent Application Ser. No. 60/302,916, filed Jul. 3, 2001, which is hereby incorporated by reference.

FIELD

The invention relates to safety systems and more particularly to restraining members for use in high-speed safety systems for power equipment.

BACKGROUND

Safety systems are often employed with power equipment such as table saws, miter saws and other woodworking machinery, to minimize the risk of injury when using the equipment. Probably the most common safety feature is a guard that physically blocks an operator from making contact with dangerous components of machinery, such as belts, shafts or blades. In many cases, guards effectively reduce the risk of injury, however, there are many instances where the nature of the operations to be performed precludes using a guard that completely blocks access to hazardous machine parts.

Other safety systems try to prevent or minimize injury by detecting and reacting to an event. For instance, U.S. Pat. Nos. 3,953,770, 4,075,961, 4,470,046, 4,532,501 and 5,212,621, the disclosures of which are incorporated herein by reference, disclose radio-frequency safety systems which utilize radio-frequency signals to detect the presence of a user's hand in a dangerous area of the machine and thereupon prevent or interrupt operation of the machine. U.S. Pat. Nos. 3,785,230 and 4,026,177, the disclosures of which are herein incorporated by reference, disclose a safety system for use on circular saws to stop the blade when a user's hand approaches the blade. The system uses the blade as an antenna in an electromagnetic proximity detector to detect the approach of a user's hand prior to actual contact with the blade. Upon detection of a user's hand, the system engages a brake using a standard solenoid. Unfortunately, such a system is prone to false triggers and is relatively slow acting because of the solenoid and the way the solenoid is used.

U.S. Pat. No. 4,117,752, which is herein incorporated by reference, discloses a braking system for use with a band saw, where the brake is triggered by actual contact between the user's hand and the blade. However, the system described for detecting blade contact does not appear to be functional to accurately and reliably detect contact. Furthermore, the system relies on standard electromagnetic brakes operating off of line voltage to stop the blade and pulleys of the band saw. It is believed that such brakes would take 50 ms to 1 s to stop the blade. Therefore, the system is too slow to stop the blade quickly enough to avoid serious injury.

None of these existing systems have operated with sufficient speed and/or reliability to prevent serious injury with many types of commonly used power tools.

BRIEF DESCRIPTION OF THE DRAWINGS

FIG. 5 shows a plate used to construct a pivot arm used in the actuator of FIG. 3.

FIG. 6 shows how the plate of FIG. 5 is folded to construct the pivot arm.

FIG. 7 shows a plate used to construct another pivot arm used in the actuator of FIG. 3.

FIG. 8 shows how the plate of FIG. 7 is folded.

FIG. 9 shows a restraining plate used in the actuator of FIG. 3.

FIG. 10 shows the actuator of FIG. 3 in a fired or actuated state.

DETAILED DESCRIPTION

Figure 1:
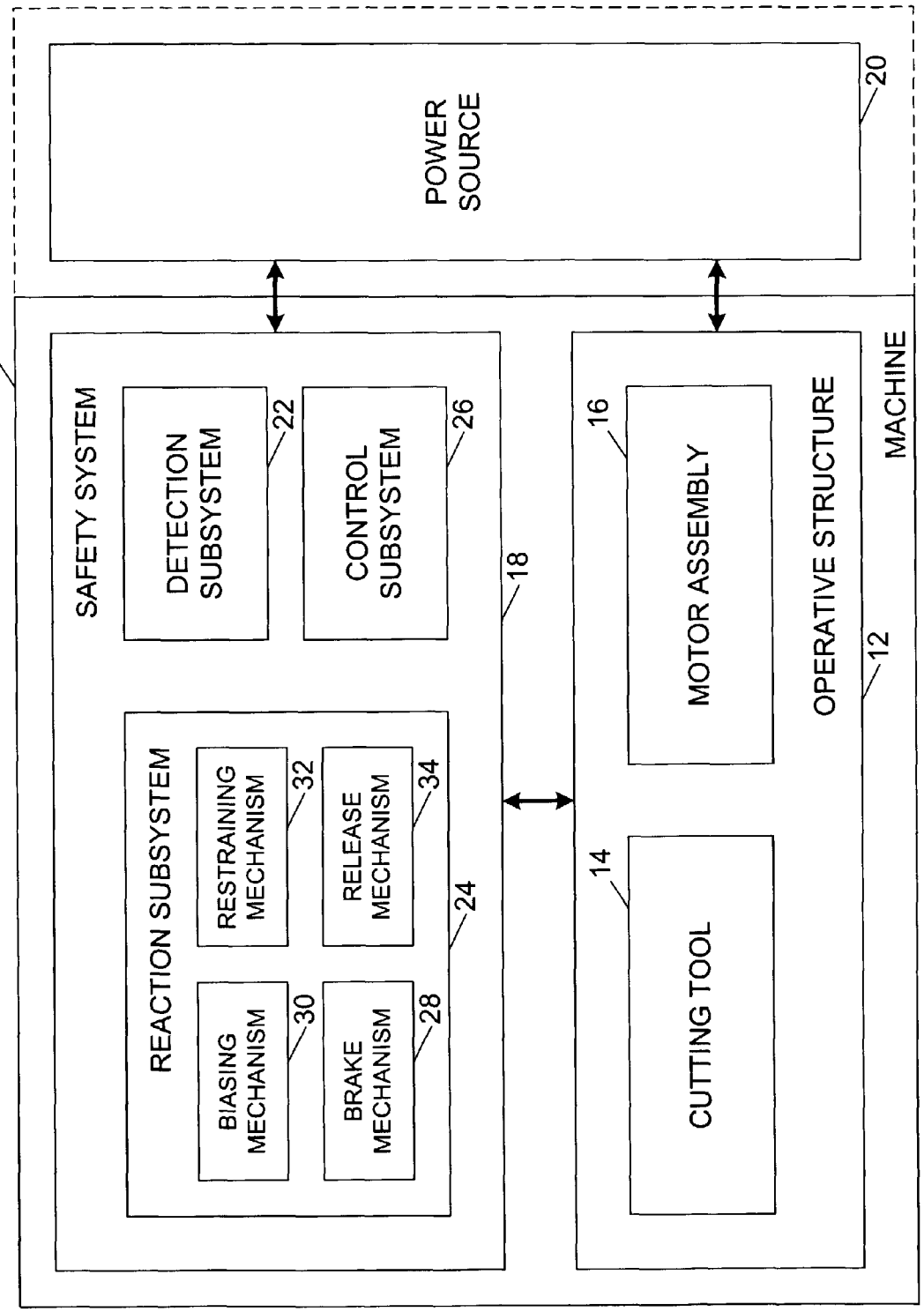
FIG. 1 is a schematic block diagram of a machine with a fast-acting safety system.

A machine that may incorporate a firing subsystem according to the present invention is shown schematically in FIG. 1 and indicated generally at 10. Machine 10 may be any of a variety of different machines adapted for cutting workpieces, such as wood, including a table saw, miter saw (chop saw), radial arm saw, circular saw, band saw, jointer, planer, etc. Machine 10 includes an operative structure 12 having a cutting tool 14 and a motor assembly 16 adapted to drive the cutting tool. Machine 10 also includes a safety system 18 configured to minimize the potential of a serious injury to a person using machine 10. Safety system 18 is adapted to detect the occurrence of one or more dangerous conditions during use of machine 10. If such a dangerous condition is detected, safety system 18 is adapted to engage operative structure 12 to limit any injury to the user caused by the dangerous condition.

Machine 10 also includes a suitable power source 20 to provide power to operative structure 12 and safety system 18. Power source 20 may be an external power source such as line current, or an internal power source such as a battery. Alternatively, power source 20 may include a combination of both external and internal power sources. Furthermore, power source 20 may include two or more separate power sources, each adapted to power different portions of machine 10.

It will be appreciated that operative structure 12 may take any one of many different forms, depending on the type of machine 10. For example, operative structure 12 may include a stationary housing configured to support motor assembly 16 in driving engagement with cutting tool 14. Alternatively, operative structure 12 may include a movable structure configured to carry cutting tool 14 between multiple operating positions. As a further alternative, operative structure 12 may include one or more transport mechanisms adapted to convey a workpiece toward and/or away from cutting tool 14.

Motor assembly 16 includes one or more motors adapted to drive cutting tool 14. The motors may be either directly or indirectly coupled to the cutting tool, and may also be adapted to drive workpiece transport mechanisms. Cutting tool 14 typically includes one or more blades or other suitable cutting implements that are adapted to cut or remove portions from the workpieces. The particular form of cutting tool 14 will vary depending upon the various embodiments of machine 10. For example, in table saws, miter saws, circular saws and radial arm saws, cutting tool 14 will typically include one or more circular rotating blades having a plurality of teeth disposed along the perimetrical edge of the blade. For a jointer or planer, the cutting tool typically includes a plurality of radially spaced-apart blades. For a band saw, the cutting tool includes an elongate, circuitous tooth-edged band.

Safety system 18 includes a detection subsystem 22, a reaction subsystem 24 and a control subsystem 26. Control subsystem 26 may be adapted to receive inputs from a variety of sources including detection subsystem 22, reaction subsystem 24, operative structure 12 and motor assembly 16. The control subsystem may also include one or more sensors adapted to monitor selected parameters of machine 10. In addition, control subsystem 26 typically includes one or more instruments operable by a user to control the machine. The control subsystem is configured to control machine 10 in response to the inputs it receives.

Detection subsystem 22 is configured to detect one or more dangerous, or triggering, conditions during use of machine 10. For example, the detection subsystem may be configured to detect that a portion of the user's body is dangerously close to, or in contact with, a portion of cutting tool 14. As another example, the detection subsystem may be configured to detect the rapid movement of a workpiece due to kickback by the cutting tool, as is described in U.S. Provisional Patent Application Ser. No. 60/182,866, entitled "Fast-Acting Safety Stop," filed Feb. 16, 2000 by SD3, LLC, the disclosure of which is herein incorporated by reference. In some embodiments, detection subsystem 22 may inform control subsystem 26 of the dangerous condition, which then activates reaction subsystem 24. In other embodiments, the detection subsystem may be adapted to activate the reaction subsystem directly.

Once activated in response to a dangerous condition, reaction subsystem 24 is configured to engage operative structure 12 quickly to prevent serious injury to the user. It will be appreciated that the particular action to be taken by reaction subsystem 24 will vary depending on the type of machine 10 and/or the dangerous condition that is detected. For example, reaction subsystem 24 may be configured to do one or more of the following: stop the movement of cutting tool 14, disconnect motor assembly 16 from power source 20, place a barrier between the cutting tool and the user, or retract the cutting tool from its operating position, etc. The reaction subsystem may be configured to take a combination of steps to protect the user from serious injury. Placement of a barrier between the cutting tool and teeth is described in more detail in U.S. Provisional Patent Application Ser. No. 60/225,206, entitled "Cutting Tool Safety System," filed Aug. 14, 2000 by SD3, LLC, the disclosure of which is herein incorporated by reference. Retraction of the cutting tool from its operating position is described in more detail in U.S. Provisional Patent Application Ser. No. 60/225,089, entitled "Retraction System For Use In Power Equipment," also filed Aug. 14, 2000 by SD3, LLC, the disclosure of which is herein incorporated by reference.

The configuration of reaction subsystem 24 typically will vary depending on which action(s) are taken. In the exemplary embodiment depicted in FIG. 1, reaction subsystem 24 is configured to stop the movement of cutting tool 14 and includes a brake mechanism 28, a biasing mechanism 30, a restraining mechanism 32, and a release mechanism 34. Brake mechanism 28 is adapted to engage operative structure 12 under the urging of biasing mechanism 30. During normal operation of machine 10, restraining mechanism 32 holds the brake mechanism out of engagement with the operative structure. However, upon receipt of an activation signal by reaction subsystem 24, the brake mechanism is released from the restraining mechanism by release mechanism 34, whereupon, the brake mechanism quickly engages at least a portion of the operative structure to bring the cutting tool to a stop.

Figure 2:
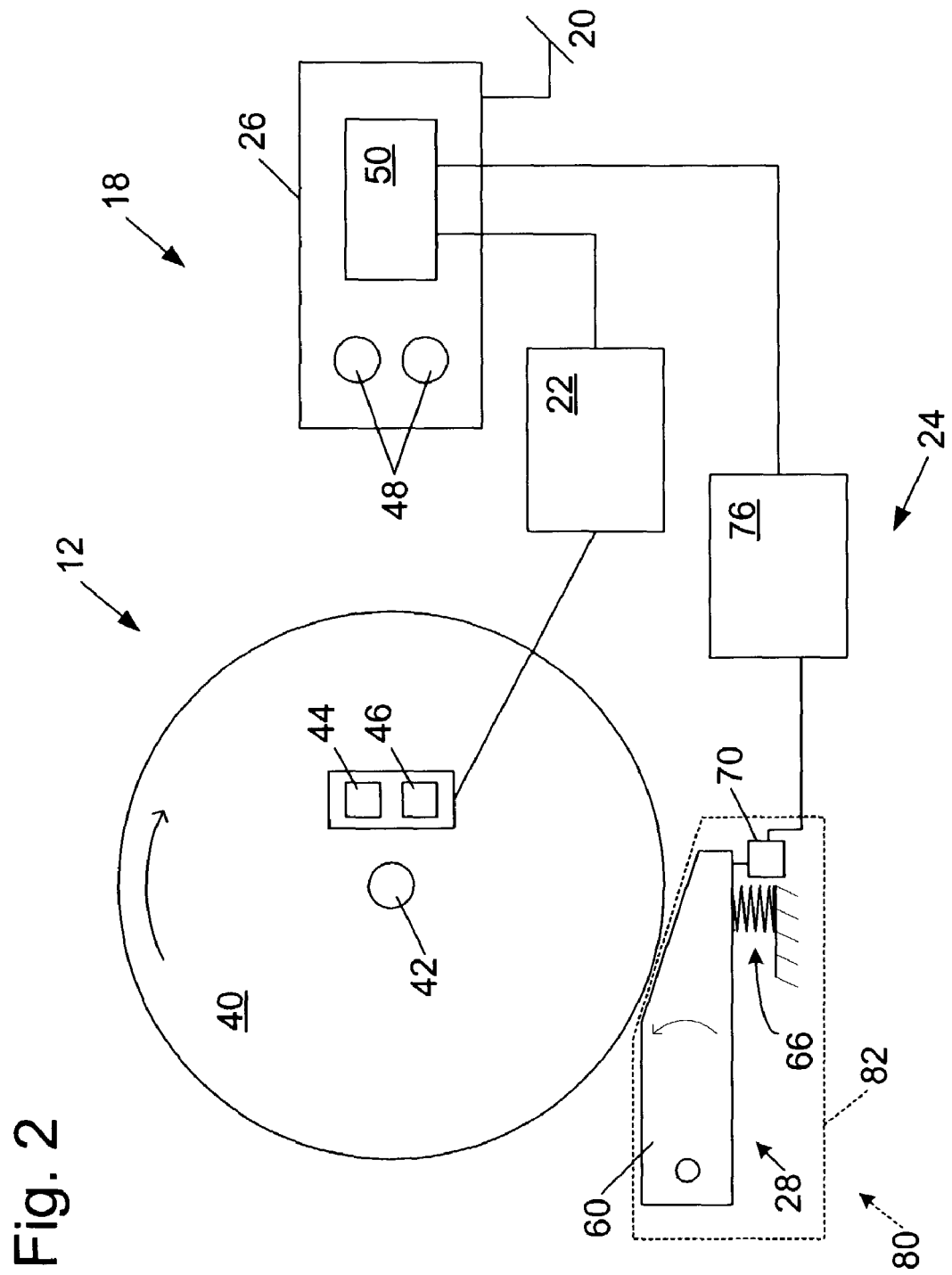
FIG. 2 is a schematic diagram of an exemplary safety system in the context of a machine having a circular blade.

It will be appreciated by those of skill in the art that the exemplary embodiment depicted in FIG. 1 and described above may be implemented in a variety of ways depending on the type and configuration of operative structure 12. Turning attention to FIG. 2, one example of the many possible implementations of safety system 18 is shown. System 18 is configured to engage an operative structure having a cutting tool in the form of a circular blade 40 mounted on a rotating shaft or arbor 42. Blade 40 includes a plurality of cutting teeth (not shown) disposed around the outer edge of the blade. As described in more detail below, braking mechanism 28 is adapted to engage the teeth of blade 40 and stop the rotation of the blade. U.S. Provisional Patent Application Ser. No. 60/225,210, entitled "Translation Stop For Use In Power Equipment," filed Aug. 14, 2000 by SD3, LLC, the disclosure of which is herein incorporated by reference, describes other systems for stopping the movement of the cutting tool. U.S. Provisional Patent Application Ser. No. 60/225,058, entitled "Table Saw With Improved Safety System," filed Aug. 14, 2000 by SD3, LLC, and U.S. Provisional Patent Application Ser. No. 60/225,057, entitled "Miter Saw With Improved Safety System," filed Aug. 14, 2000 by SD3, LLC, the disclosures of which are herein incorporated by reference, describe safety system 18 in the context of particular types of machines 10.

In the exemplary implementation, detection subsystem 22 is adapted to detect the dangerous condition of the user coming into contact with blade 40. The detection subsystem includes a sensor assembly, such as contact detection plates 44 and 46, capacitively coupled to blade 40 to detect any contact between the user's body and the blade. Typically, the blade, or some larger portion of cutting tool 14 is electrically isolated from the remainder of machine 10. Alternatively, detection subsystem 22 may include a different sensor assembly configured to detect contact in other ways, such as optically, resistively, etc. In any event, the detection subsystem is adapted to transmit a signal to control subsystem 26 when contact between the user and the blade is detected. Various exemplary embodiments and implementations of detection subsystem 22 are described in more detail in U.S. Provisional Patent Application Ser. No. 60/225,200, entitled "Contact Detection System For Power Equipment," filed Aug. 14, 2000 by SD3, LLC, and U.S. Provisional Patent Application Ser. No. 60/225,211, entitled "Apparatus And Method For Detecting Dangerous Conditions In Power Equipment," filed Aug. 14, 2000 by SD3, LLC, the disclosures of which are herein incorporated by reference.

Control subsystem 26 includes one or more instruments 48 that are operable by a user to control the motion of blade 40. Instruments 48 may include start/stop switches, speed controls, direction controls, etc. Control subsystem 26 also includes a logic controller 50 connected to receive the user's inputs via instruments 48. Logic controller 50 is also connected to receive a contact detection signal from detection subsystem 22. Further, the logic controller may be configured to receive inputs from other sources (not shown) such as blade motion sensors, workpiece sensors, etc. In any event, the logic controller is configured to control operative structure 12 in response to the user's inputs through instruments 48. However, upon receipt of a contact detection signal from detection subsystem 22, the logic controller overrides the control inputs from the user and activates reaction subsystem 24 to stop the motion of the blade. Various exemplary embodiments and implementations of control subsystem 26 are described in more detail in U.S. Provisional Patent Application Ser. No.

60/225,059, entitled "Logic Control For Fast Acting Safety System," filed Aug. 14, 2000 by SD3, LLC, and U.S. Provisional Patent Application Ser. No. 60/225,094, entitled "Motion Detecting System For Use In Safety System For Power Equipment," filed Aug. 14, 2000 by SD3, LLC, the disclosures of which are herein incorporated by reference.

In the exemplary implementation, brake mechanism 28 includes a pawl 60 mounted adjacent the edge of blade 40 and selectively moveable to engage and grip the teeth of the blade. Pawl 60 may be constructed of any suitable material adapted to engage and stop the blade. As one example, the pawl may be constructed of a relatively high strength thermoplastic material such as polycarbonate, ultrahigh molecular weight polyethylene (UHMW) or Acrylonitrile Butadiene Styrene (ABS), etc., or a metal such as aluminum, etc. It will be appreciated that the construction of pawl 60 will vary depending on the configuration of blade 40. In any event, the pawl is urged into the blade by a biasing mechanism in the form of a spring 66. In the illustrative embodiment shown in FIG. 2, pawl 60 is pivoted into the teeth of blade 40. It should be understood that sliding or rotary movement of pawl 60 might also be used. The spring is adapted to urge pawl 60 into the teeth of the blade with sufficient force to grip the blade and quickly bring it to a stop.

A restraining member 70 holds the pawl away from the edge of the blade. The restraining member may take different forms. For example, in some embodiments the restraining member is a fusible member. The fusible member is constructed of a suitable material and adapted to restrain the pawl against the bias of spring 66, and also adapted to melt under a determined electrical current density to release the pawl. Various exemplary embodiments and implementations of restraining members and fusible members are described in more detail in U.S. Provisional Patent Application Ser. No. 60/225,056, entitled "Firing Subsystem for use in a Fast-Acting Safety System," filed Aug. 14, 2000 by SD3, LLC, the disclosure of which is herein incorporated by reference. In other embodiments, the restraining member may include various mechanical linkages, or may be part of various actuators, and those linkages and/or actuators may be released or fired by solenoids, gas cylinders, electromagnets, and/or explosives. Preferably restraining member 70 holds the pawl relatively close to the edge of the blade to reduce the distance pawl 60 must travel to engage blade 40. Positioning the pawl relatively close to the edge of the blade reduces the time required for the pawl to engage and stop the blade. Typically, the pawl is held approximately 1/32-inch to 1/4-inch from the edge of the blade by restraining member 70, however other pawl-to-blade spacings may also be used within the scope of the invention.

Pawl 60 is released from its unactuated, or cocked, position to engage blade 40 by a release mechanism in the form of a firing subsystem 76. The firing subsystem is configured to release the restraining member 70 so that the pawl can move into the blade. For example, firing subsystem 76 may melt a fusible member by passing a surge of electrical current through the fusible member, or the firing subsystem may trigger a solenoid, gas cylinder, electromagnet or explosive to release or move the pawl. Firing subsystem 76 is coupled to logic controller 50 and activated by a signal from the logic controller. When the logic controller receives a contact detection signal from detection subsystem 22, the logic controller sends an activation signal to firing subsystem 76, thereby releasing the pawl to stop the blade. Various exemplary embodiments and implementations of reaction subsystem 24 are described in more detail in U.S. Provisional Patent Application Ser. No. 60/225,170, entitled "Spring-Biased Brake Mechanism for Power Equipment," filed Aug. 14, 2000 by SD3, LLC, and U.S. Provisional Patent Application Ser. No. 60/225,169, entitled "Brake Mechanism For Power Equipment," filed Aug. 14, 2000 by SD3, LLC, the disclosures of which are herein incorporated by reference.

It will be appreciated that activation of the brake mechanism will require the replacement of one or more portions of safety system 18. For example, pawl 60 and restraining member 70 typically must be replaced before the safety system is ready to be used again. Thus, it may be desirable to construct one or more portions of safety system 18 in a cartridge that can be easily replaced. For example, in the exemplary implementation depicted in FIG. 2, safety system 18 includes a replaceable cartridge 80 having a housing 82. Pawl 60, spring 66, restraining member 70 are all mounted within housing 82. Alternatively, other portions of safety system 18 may be mounted within the housing. In any event, after the reaction system has been activated, the safety system can be reset by replacing cartridge 80. The portions of safety system 18 not mounted within the cartridge may be replaced separately or reused as appropriate. Various exemplary embodiments and implementations of a safety system using a replaceable cartridge are described in more detail in U.S. Provisional Patent Application Ser. No. 60/225,201, entitled "Replaceable Brake Mechanism For Power Equipment," filed Aug. 14, 2000 by SD3, LLC, and U.S. Provisional Patent Application Ser. No. 60/225,212, entitled "Brake Positioning System," filed Aug. 14, 2000 by SD3, LLC, the disclosures of which are herein incorporated by reference.

While one particular implementation of safety system 18 has been described, it will be appreciated that many variations and modifications are possible within the scope of the invention. Many such variations and modifications are described in U.S. Provisional Patent Application Ser. No. 60/157,340, entitled "Fast-Acting Safety Stop," filed Oct. 1, 1999, and Ser. No. 60/182,866, also entitled "Fast-Acting Safety Stop," filed Feb. 16, 2000, the disclosures of which are herein incorporated by reference.

As explained above, in some embodiments of safety system 18, a restraining member 70 is used to restrain some element or action, such as to hold a brake or pawl away from a blade. Such a restraining member may take different forms, for example, it may be an actuator or part of an actuator that applies a force to move a brake pawl into a blade. One possible embodiment of such an actuator is shown at 99 in FIGS. 3 and 4.

The depicted embodiment includes a solenoid 100 mounted in a housing 102. Solenoid 100 includes a wire helically coiled around a tube or cylinder. A metal core or plunger, often taking the form of a rod, is positioned adjacent the cylinder at least partially within the coiled wire. The solenoid creates a magnetic field when electric current flows through the coiled wire, and the magnetic field then causes the plunger to move, typically drawing the plunger into the cylinder. The plunger is often spring-biased out from the cylinder so that it extends from the cylinder when there is no current flowing through the coil, and then is drawn in when current is flowing through the coil. Thus, solenoids are used to move a plunger in and out depending on whether electricity flows through the coil. The in-and-out movement of the plunger can be used to trigger or cause some action to take place. The solenoid may be powered by firing circuit 76.

Solenoid 100 may be any one of various solenoids. For example, it may be TO-5 solenoid from Line Electric Company of South Glastonbury, Conn. Those solenoids may apply forces of 1 to 50 grams with response times of around 0.5 milliseconds, depending on the power supplied to the coil, the distance the plunger moves, and other variables. Of course, TO-5 solenoids are identified only as examples, and other solenoids may be used.

Figure 3:
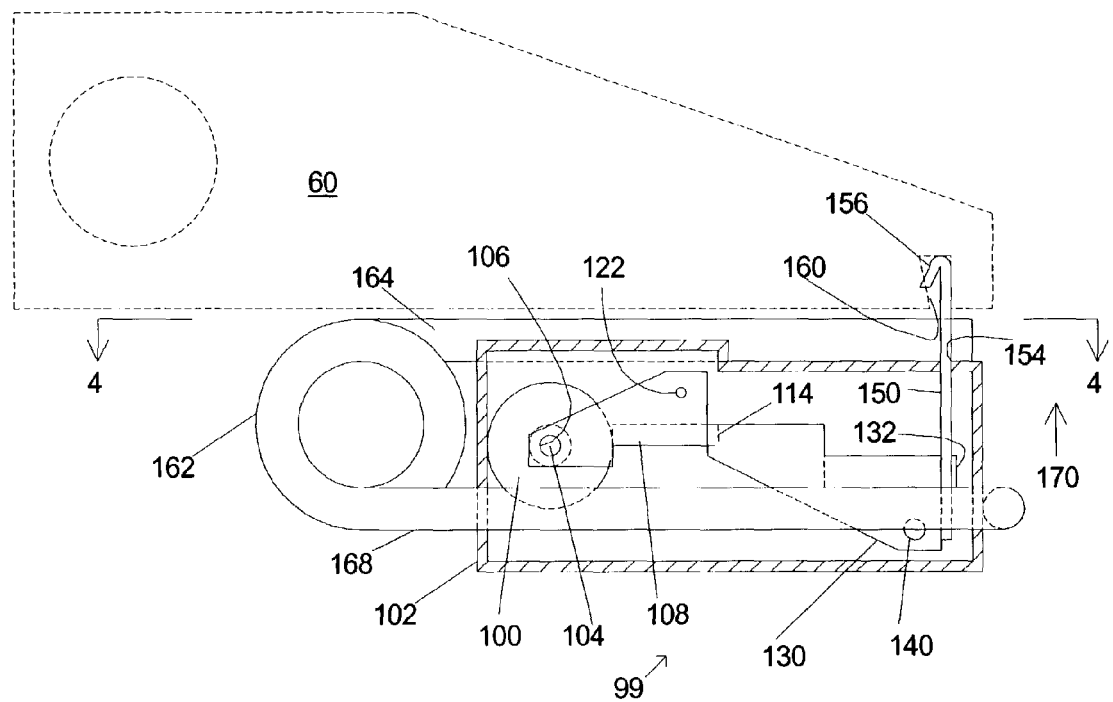
FIG. 3 shows a possible actuator for use in a safety system.
Figure 4:
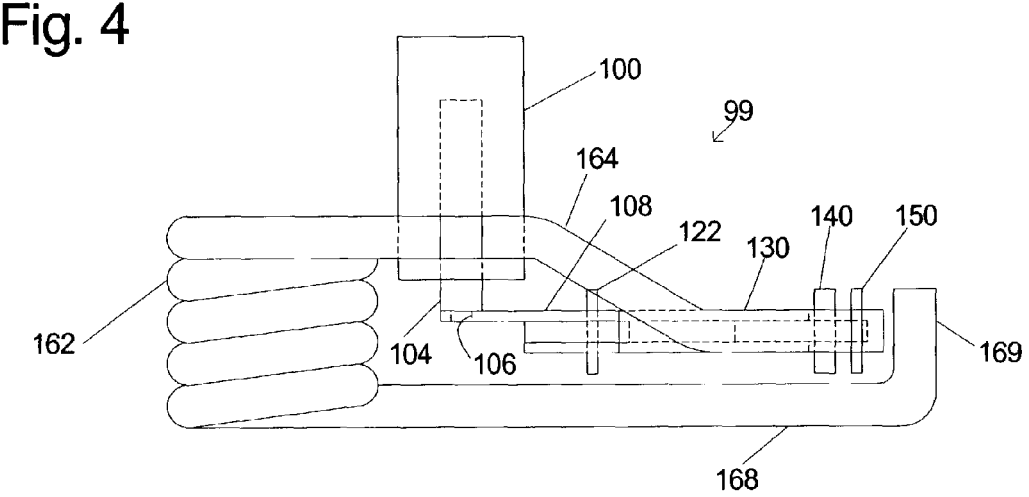
FIG. 4 shows a simplified view of the actuator shown in FIG. 3 from a different perspective.

In the embodiment shown in FIGS. 3 and 4, a plunger 104 extends outwardly from solenoid 100. A spring or some other biasing means biases plunger 104 outwardly from the solenoid, and the plunger is drawn into the solenoid when current flows through the solenoid. The embodiment shown in FIGS. 3 and 4 uses the movement of plunger 104 to release brake pawl 60 to stop the blade of a saw, as described above.

The end of plunger 104 that extends outwardly from solenoid 100 passes into an aperture 106 in a first pivot arm 108. First pivot arm 108 may take many different forms. In FIGS. 3 and 4, first pivot arm 108 is made from a flat piece of metal, as shown in FIG. 5, and it includes ends 112 and 114, and first and second wing portions 116 and 118. A cut 120 is made between the wing portions and end 116. The wings and end 118 are then folded together into something like a "W" shape when viewed from end 118, as shown in FIG. 6. Cut 120 allows for the center section to be folded into the "W" shape. When folded, the wings provide rigidity and ends 116 and 118 extend outwardly, as shown in FIG. 3. A pivot pin 122 is supported by housing 102, and first pivot arm 108 is mounted to pivot around pivot pin 122. Pivot pin 122 extends through apertures 124 and 126 in wings 112 and 114. However, plunger 104 extends into aperture 106 in first pivot arm 108 and thereby prevents the first pivot arm from pivoting.

Actuator 99 also includes a second pivot arm 130. Second pivot arm 130, like the first pivot arm, may take many different forms. The form shown in FIGS. 3 and 4 is similar to the shape of the first pivot arm, and is also made from a flat piece of metal, as shown in FIG. 7. The flat piece of metal includes ends 131 and 132, and wings 134 and 136. A cut 138 is made in the metal, so that the wings and end 132 can be folded into a "W" shape when viewed from end 132, as shown in FIG. 8. A second pivot pin 140 is supported by housing 102, and second pivot arm 130 is mounted to pivot around pivot pin 140. Pivot pin 140 extends through apertures 142 and 144 in wings 134 and 136. However, end 114 of first pivot arm 108 extends over and against end 131 of the second pivot arm to prevent the second pivot arm from pivoting.

Second pivot arm 130, in turn, holds a plate 150 in place. Plate 150 is shown in FIGS. 3, 4 and 9. End 132 of second pivot arm 130 extends through an aperture 152 in plate 150 to hold the plate in place. Plate 150 extends out of housing 102 through a slot 154 in the housing, and a barb 156 on end 158 of the plate engages a slot 160 in brake pawl 60. In this manner, plate 150 holds brake pawl 60 in place. Of course, the plate may engage with the brake pawl in many different ways, such as by a hook, a simple friction fit, an abutment, etc., and barb 156 is only one example. Brake pawl 60 also may be positioned relative to actuator 99 in different ways. For example, the brake pawl may be oriented so that it extends approximately perpendicularly from the actuator (or out of or into the page when looking at FIG. 3).

Actuator 99 also includes a torsion spring 162, having a first arm 164 that extends through an aperture 166 in plate 150. Spring 162 also includes a second arm 168 that extends adjacent housing 102. Second arm 168 may pass through apertures in the housing to mount the spring to the housing, or the arm may be attached to the housing in some other way, such as with screws or mounting clips. When spring 162 is compressed, the spring force causes arms 164 and 168 to want to spread apart. Thus, when second arm 168 is attached to housing 102, and the housing is mounted in a saw, the spring wants to move first arm 164 in the direction of arrow 170. That spring arm 164, in turn, pushes plate 150 and brake pawl 60 in the direction of arrow 170, which would be toward the blade of a saw, as explained above. However, plate 150 is prevented from moving by second pivot arm 130, which is held in place by first pivot arm 108, which is held in place by plunger 104 in solenoid 100, as explained. Thus, spring 162 holds the parts of actuator 99 in tension. That tension helps hold plate 150 in place. Spring 162 is often a strong spring, capable of applying 100 pounds or more of force, so the tension on the components of actuator 99 is significant. That tension makes the actuator and components substantially stable and able to withstand the normal vibrations and jostling of a saw. Second arm 168 of spring 162 includes a bend 169 at its end to provide stability for the spring and to counter any twisting or torque of the spring when the spring is compressed.

When electric current is applied to solenoid 100, plunger 104 is retracted, allowing the first pivot arm to pivot around pin 122. When the first pivot arm is released, the second pivot arm and plate are also released and free to move. Spring 162 then forces plate 150 to move in the direction of arrow 170, and the first and second pivot arms pivot as shown in FIG. 10. Aperture 152 in plate 150 is sized and shaped to allow end 132 of the second pivot arm to move out of the aperture as the plate is pulled in the direction of arrow 170. Housing 102 is sized to provide the space necessary for the pivot arms to pivot sufficiently to release plate 150.

Thus, actuator 99 provides a mechanism that releases a force by using a solenoid. The force is then used to move a brake pawl into the teeth of a spinning saw blade, as explained above. Solenoid 100 must be sufficiently strong to overcome the friction between plunger 104 and aperture 106 caused by spring 162 putting tension on the parts of the actuator. Otherwise, the solenoid could not retract plunger 104. Often, as stated, a very strong spring is used to push the brake pawl into the saw blade as quickly as possible. However, the stronger the spring, the more tension on the system and the more friction between the plunger and the aperture. Actuator 99 accommodates strong springs by using multiple pivot arms. For example, the two pivot arms described above provide the mechanical advantage necessary to hold a strong spring. Two or more pivot arms are used to gain the advantage of multiple pivot points, rather than using a single pivot point with a longer moment arm. However, a single pivot arm may be used in some embodiments. In the embodiment shown in FIGS. 3 and 4, a solenoid that can retract a plunger with a force of approximately 50 grams can hold a spring force of around 100 Newtons, considering that first pivot arm 108 provides a mechanical advantage of a factor of 3 to 4, and second pivot arm 130 provides a mechanical advantage of a factor of around 6, and the solenoid would need to provide a retraction force to overcome the friction on the plunger of approximately $1/10^{th}$ of the force on the plunger from the spring. Of course, the pivot arms can be sized differently to provide the mechanical advantage necessary for different springs, or different numbers of pivot arms can be used. One significant advantage of using a mechanical linkage like the two pivot arms discussed above, is that actuator 99 may use a solenoid that is physically small and relatively inexpensive to release the spring, resulting in an actuator that is effective, economical, and sized so that it is applicable to various types of saws.

Another significant benefit of the actuator shown in FIGS. 3 and 4 is that it completely releases a significant force with only a short, discrete movement of plunger 104. The plunger need only retract a specified and determined amount to disengage with first pivot arm 108, and the entire force of spring 162 is released. Thus, the speed at which the actuator can apply a force is maximized because time is not spent by the solenoid moving the plunger a significant distance. That results in being able to stop the blade of the saw quicker that otherwise would be possible, and stopping the blade as quickly as possible minimizes any injury to a person accidentally contacting the blade.

The solenoid also must be sufficiently strong to overcome the spring or other means that biases plunger 104 outwardly. The solenoid also must release the force quickly enough so that the brake can engage and stop the saw blade before a person who accidentally contacts the blade receives a serious injury under typical circumstances. The necessary release time will depend on the embodiment, but will usually not exceed around 5 milliseconds. Of course, the shorter the release time the better.

Housing 102 for actuator 99 is shaped to accommodate the solenoid, pivot arms and restraining plate. The housing typically would be sealed against the entry of sawdust, with the only opening being slot 154 through which plate 150 passes. The housing is compact, and is designed to work as a "drop-in" component or cartridge. For example, a saw can be constructed to accommodate a brake pawl and actuator, and then after the actuator has fired and the brake pawl has moved into the blade, the spent actuator and brake pawl can be removed and a new actuator and brake pawl dropped in.

Figure 11:
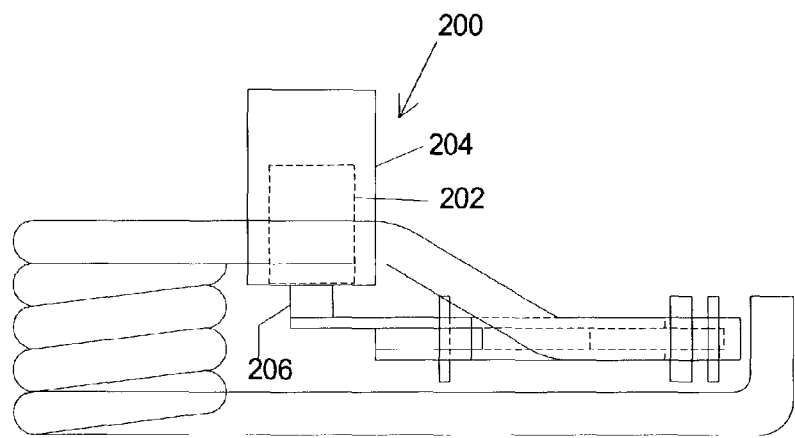
FIG. 11 shows an actuator using a voice coil.

Actuator 99 shown in FIGS. 3 and 4 is only one of various embodiments that can be used in the safety system described herein. Another embodiment is shown in FIG. 11, and is similar to the actuator shown in FIGS. 3 and 4 except that it uses a voice coil actuator 200 instead of a solenoid and plunger. Voice coil actuator 200 includes a wire coil 202 adjacent a magnet 204, similar to the construction of a speaker. When electric current from firing system 76 flows through coil 202, the coil is magnetized and either attracted to or repelled from magnet 204, which causes the coil to move. A pin 206 is attached to the coil and moves with the coil. That movement can be used to release a force, like in actuator 99 discussed above. Suitable voice coil actuators may be obtained from BEI Sensors & Systems Company, Kimco Magnetic Division, of San Marcos, Calif.

Figure 12:
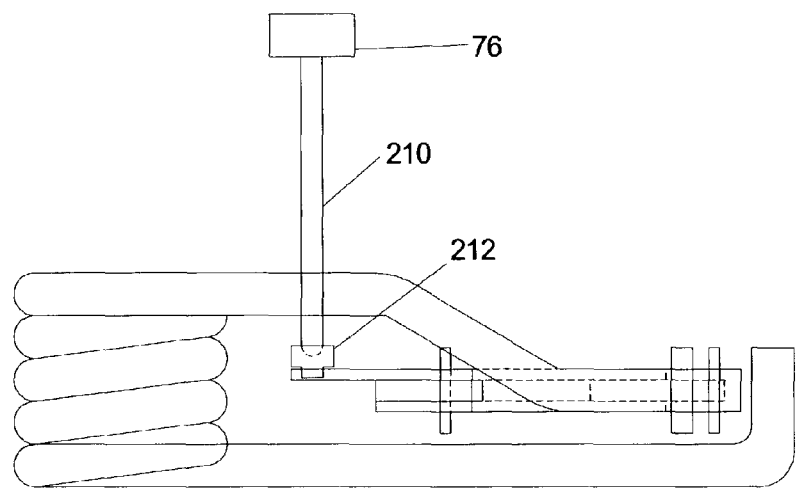
FIG. 12 shows an actuator using a shape memory alloy.
Figure 13:
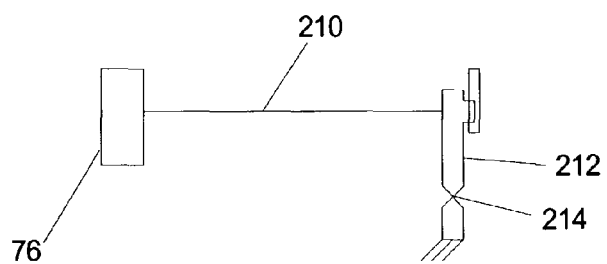
FIG. 13 shows the actuator of FIG. 12 from another view.

Another embodiment of an actuator uses a shape memory alloy to provide a movement to release a force, such as a Nitinol (nickel-titanium) actuator wire, or CuAlNi or TiNiPd alloys. Shape memory alloys are configured to contract when heated through a phase-change transition temperature, and can be restretched as they cool to ambient temperatures. One embodiment using a shape memory alloy is shown in FIG. 12, and it includes an actuator wire 210 connected to firing circuit 76 (which constitutes a source of electricity) and to a pin 212. Pin 212 engages a first pivot arm and restrains that pivot arm from moving, just as plunger 104 does in the embodiment disclosed above in connection with FIGS. 3 and 4. Pin 212 is mounted in the housing of the actuator so that it can pivot away from the pivot arm to release the arm, and also so that it can prevent the pivot arm from moving while the pin is engaged with the pivot arm, as shown in FIG. 13. A hinge joint 214 allows pin 212 to pivot. The hinge joint can be constructed to bias pin 212 toward the first pivot arm to help insure that the pin remains engaged with the pivot arm until pulled by wire 210. When electric current from firing circuit 76 flows through wire 210, the resistance of the wire heats the wire and causes the wire to contract, which pulls pin 212 free from the first pivot arm, releasing the spring force as described above. By way of example, actuator wires made of nickel-titanium and marketed by Dynalloy, Inc. under the trade name Flexinol may be used. A Flexinol wire having a diameter of approximately 0.01-inch and a resistance of 0.5-ohms per inch could provide approximately 930 grams of pull force, with an approximate current of 1000 milliamps and with a contraction of 4% of length over 1 second, where the contraction time is related to current input. Advantages of using a shape memory alloy include the relatively small size of an actuator wire, the ease of use, the low power consumption, and the relative low cost of the material. The retraction force and stroke can also be readily determined and selected. This embodiment has particular application to inexpensive hand-held circular saws, and other less expensive saws, because of the low cost and small size of shape memory alloys.

Some embodiments also may use integrated force arrays instead of solenoids or voice coil actuators to create the motion to release the force. Integrated force arrays are flexible metalized membranes that undergo deformation when voltage is applied to them. An integrated force array resembles a thin, flexible membrane, and it contracts by around 30% in one dimension when voltage is applied to it. An integrated force array may be configured to provide substantial force.

An advantage of actuators using solenoids, voice coil actuators, shape memory alloys, or integrated force arrays, is that they may be configured for multiple uses. After a movement is produced to release a force, the actuator may be "re-cocked" by compressing the spring or recreating the force, repositioning the mechanical linkage holding the force, and then reinserting a pin to restrain the linkage. Additionally, the advantages described above relating to solenoids, such a releasing a force with a short, discrete stroke, are also applicable to voice coil actuators, shape memory alloys, and integrated force arrays.

The solenoids, voice coil actuators, shape memory alloys and integrated force arrays discussed above can be connected to firing system 76 to produce the necessary electric current. As will be appreciated by those of skill in the art, there are many circuits suitable for supplying this current. A typical circuit would include one or more charge storage devices that are discharged in response to an output signal from the control subsystem. (The output signal from the control subsystem is dependant on detection of contact between the user and a blade, as explained above.) It will be appreciated, however, that a current supply may be used instead of charge storage devices. Alternatively, other devices may be used to supply the necessary current, including a silicon-controlled rectifier or triac connected to a power supply line. Transistors and/or SCRs (silicon controlled rectifiers) may be used to release the charge in the charge storage devices upon a signal from the control subsystem.

It will be appreciated by those of skill in the electrical arts that any suitable embodiment or configuration of the firing systems discussed generally above could be used. The control systems, power supplies, sense lines and other items related to or used with firing systems are discussed in more detail in U.S. Provisional Patent Application Ser. No. 60/225,200, titled "Contact Detection System for Power Equipment," U.S. Provisional Patent Application Ser. No. 60/225,211, titled "Apparatus and Method for Detecting Dangerous Conditions in Power Equipment," and U.S. Provisional Patent Application Ser. No. 60/225,059, titled "Logic Control for Fast-Acting Safety System," all filed Aug. 14, 2000, the disclosures of which are herein incorporated by reference.

INDUSTRIAL APPLICABILITY

The safety systems and actuators described herein are applicable to power equipment, and specifically to power equipment wherein some action is triggered or released. The safety systems and actuators are particularly applicable to woodworking equipment such as table saws, miter saws, band saws, circular saws, jointers, etc. The safety systems and actuators described herein may be adapted for use on a variety of other saws and machines, and further descriptions may be found in the following references, the disclosures of which are herein incorporated by reference: PCT Patent Application Serial No. PCT/US00/26812, filed Sep. 29, 2000; U.S. patent application Ser. No. 09/676,190, filed Sep. 29, 2000; U.S. Provisional Patent Application Ser. No. 60/302,937, filed Jul. 2, 2001; U.S. Provisional Patent Application Ser. No. 60/298,207, filed Jun. 13, 2001; U.S. Provisional Patent Application Ser. No. 60/292,100, filed May 17, 2001; U.S. Provisional Patent Application Ser. No. 60/292,081, filed May 17, 2001; U.S. Provisional Patent Application Ser. No. 60/279,313, filed Mar. 27, 2001; U.S. Provisional Patent Application Ser. No. 60/275,595, filed Mar. 13, 2001; U.S. Provisional Patent Application Ser. No. 60/275,594, filed Mar. 13, 2001; U.S. Provisional Patent Application Ser. No. 60/275,583, filed Mar. 13, 2001; U.S. Provisional Patent Application Ser. No. 60/273,902, filed Mar. 6, 2001; U.S. Provisional Patent Application Ser. No. 60/273,178, filed Mar. 2, 2001; U.S. Provisional Patent Application Ser. No. 60/273,177, filed Mar. 2, 2001; U.S. Provisional Patent Application Ser. No. 60/270,942, filed Feb. 22, 2001; U.S. Provisional Patent Application Ser. No. 60/270,941, filed Feb. 22, 2001; U.S. Provisional Patent Application Ser. No. 60/270,011, filed Feb. 20, 2001; U.S. Provisional Patent Application Ser. No. 60/233,459, filed Sep. 18, 2000; U.S. Provisional Patent Application Ser. No. 60/225,212, filed Aug. 14, 2000; and U.S. Provisional Patent Application Ser. No. 60/225,201, filed Aug. 14, 2000.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. No single feature, function, element or property of the disclosed embodiments is essential to all of the disclosed inventions.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. No single feature, function, element or property of the disclosed embodiments is essential to all of the disclosed inventions. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to one of the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower or equal in scope to the original claims, are also regarded as included within the subject matter of the inventions of the present disclosure.

We claim:

1. An actuator for use in a safety system for a power tool, where the power tool includes a moving cuffing element, and where the safety system includes a brake member configured to move into contact with the cutting element to stop movement of the cutting element, the actuator comprising:
   a spring adapted to expand to move the brake member into contact with the cutting element,
   a restraining mechanism adapted to hold the spring in compression so that the spring is constrained from moving the brake member into contact with the culling element, and
   a releasing mechanism configured to provide a movement to release the restraining member so the spring can expand to move the brake member into contact with the cutting element.

2. The actuator of claim 1, where the spring is a torsion spring.

3. The actuator of claim 1, where the releasing mechanism includes a solenoid.

4. The actuator of claim 1, where the releasing mechanism includes a voice coil.

5. The actuator of claim 1, where the releasing mechanism includes a shape memory alloy.

6. The actuator of claim 1, where the releasing mechanism includes an integrated force array.

7. The actuator of claim 1, where the restraining mechanism includes at least one pivot arm.

8. The actuator of claim 1, where the restraining mechanism includes a plurality of pivot arms.

9. The actuator of claim 1, where the releasing mechanism is within a housing.

10. An actuator for use in a safety system for a power tool, where the power tool includes a moving cutting element, and where the safety system includes a brake member configured to move into contact with the cutting element to stop movement of the cutting element, the actuator comprising:
    stored force means for moving the brake member into the cutting element,
    restraining means for constraining the stored force means from moving the brake member into the cutting element, and
    release means for providing a movement to release the stored force means.

* * * * *

UNITED STATES PATENT AND TRADEMARK OFFICE
CERTIFICATE OF CORRECTION

PATENT NO. : 7,712,403 B2  
APPLICATION NO. : 10/189027  
DATED : May 11, 2010  
INVENTOR(S) : Stephen F. Gass and David A. Fanning Page 1 of 1

It is certified that error appears in the above-identified patent and that said Letters Patent is hereby corrected as shown below:

Column 12, line 21, delete "culling" and insert --cutting--.

Signed and Sealed this
Tenth Day of July, 2012

David J. Kappos
*Director of the United States Patent and Trademark Office*